R. W. JEFFERIS.
RACK OR SHELVING.
APPLICATION FILED MAY 13, 1919.
1,341,852.
Patented June 1, 1920.
4 SHEETS—SHEET 3.
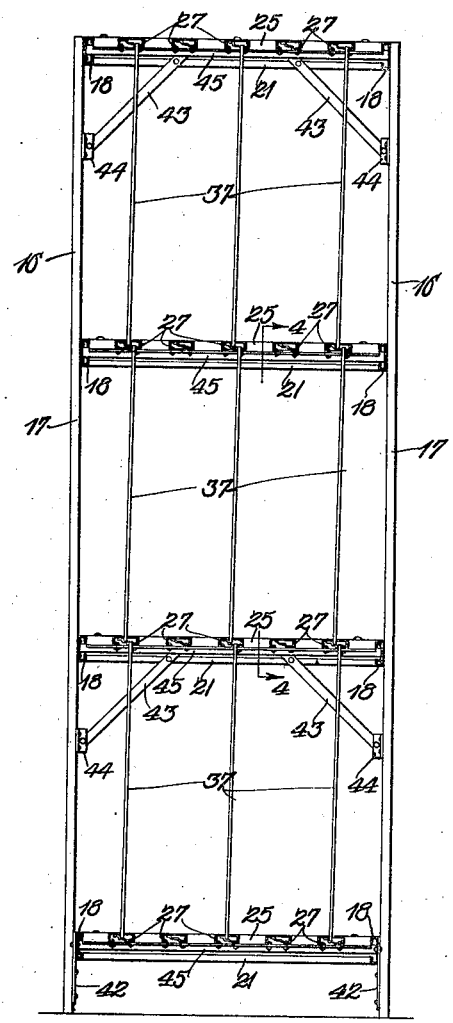
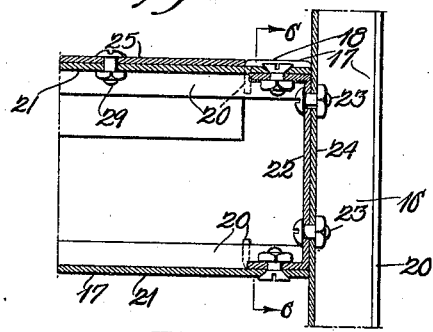
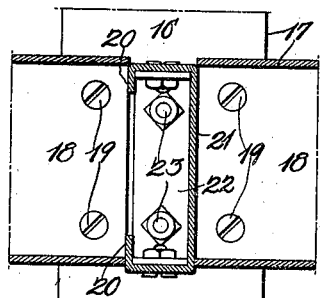
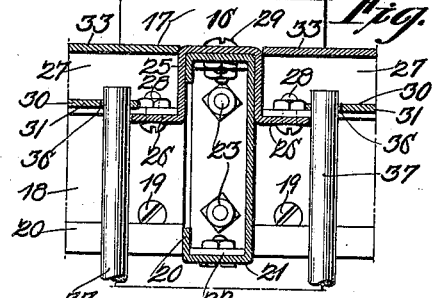
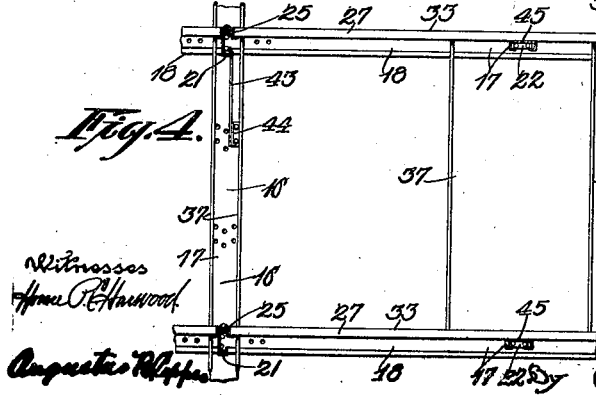

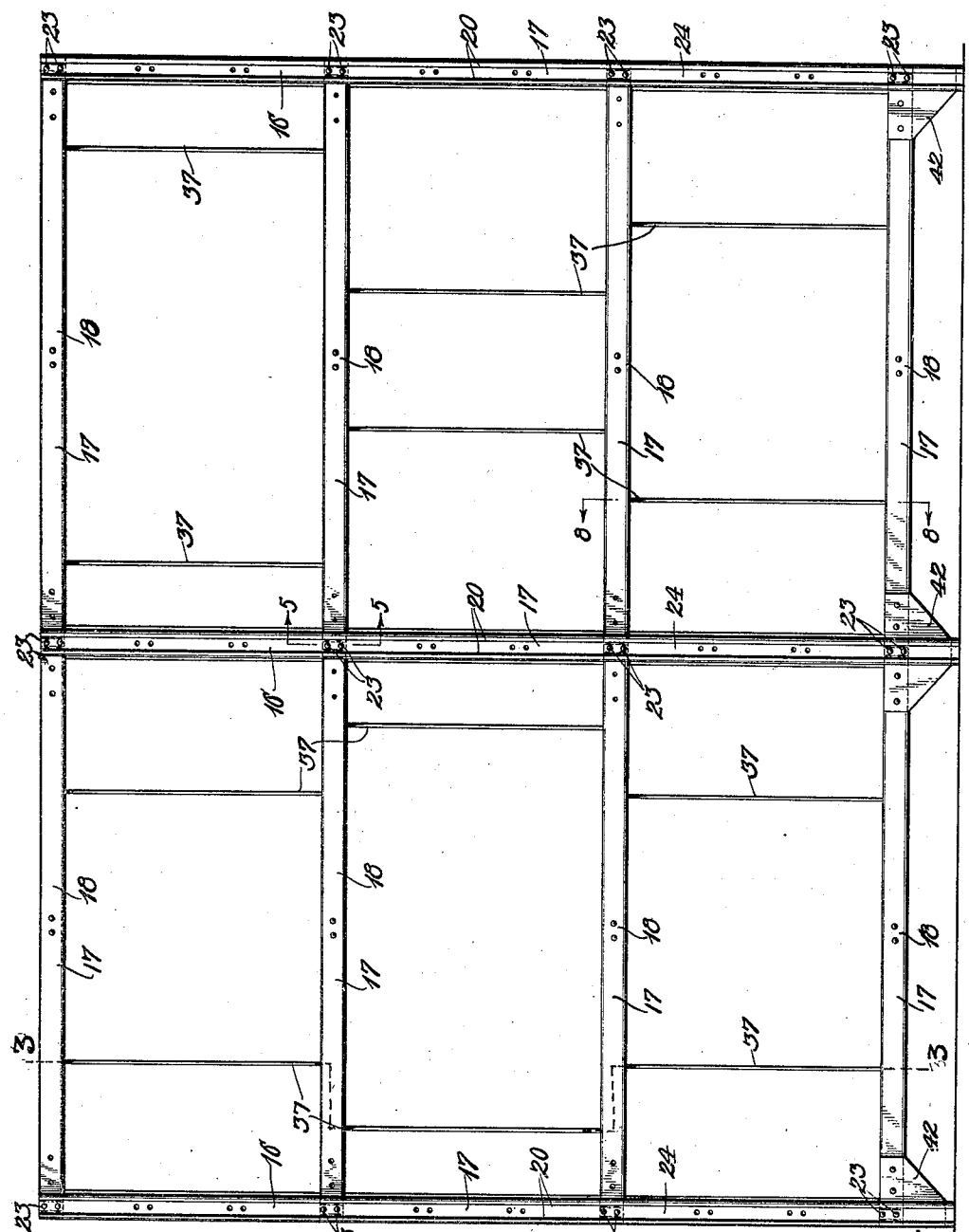

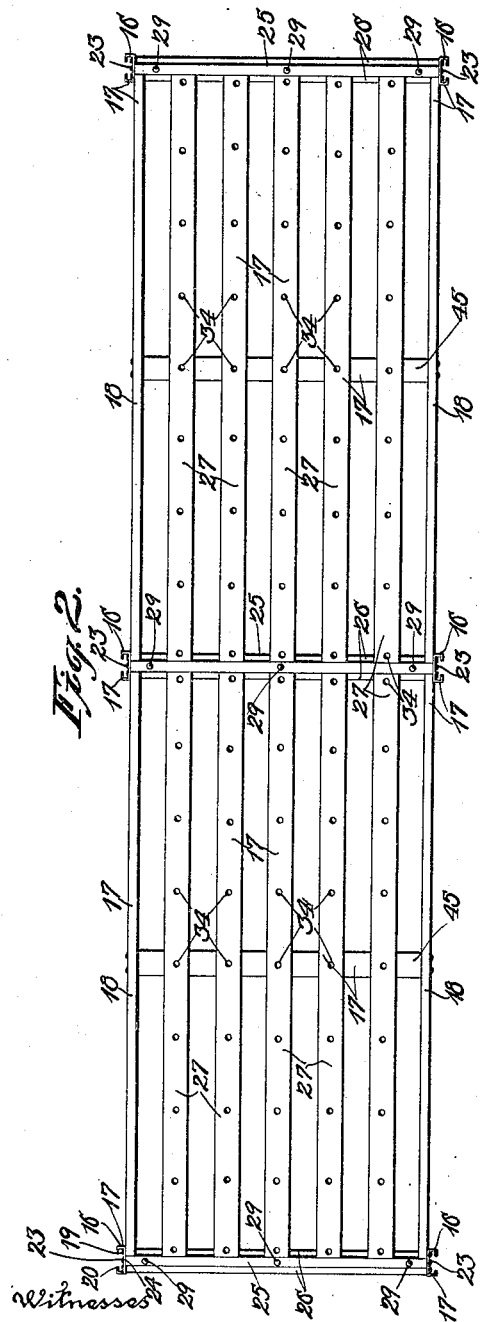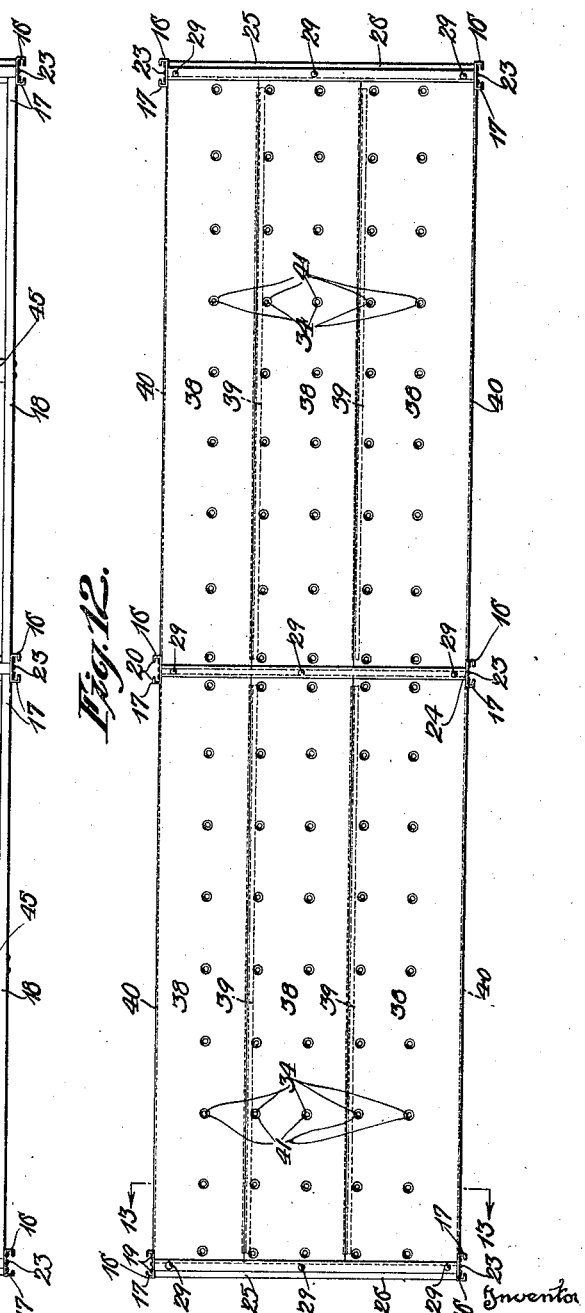

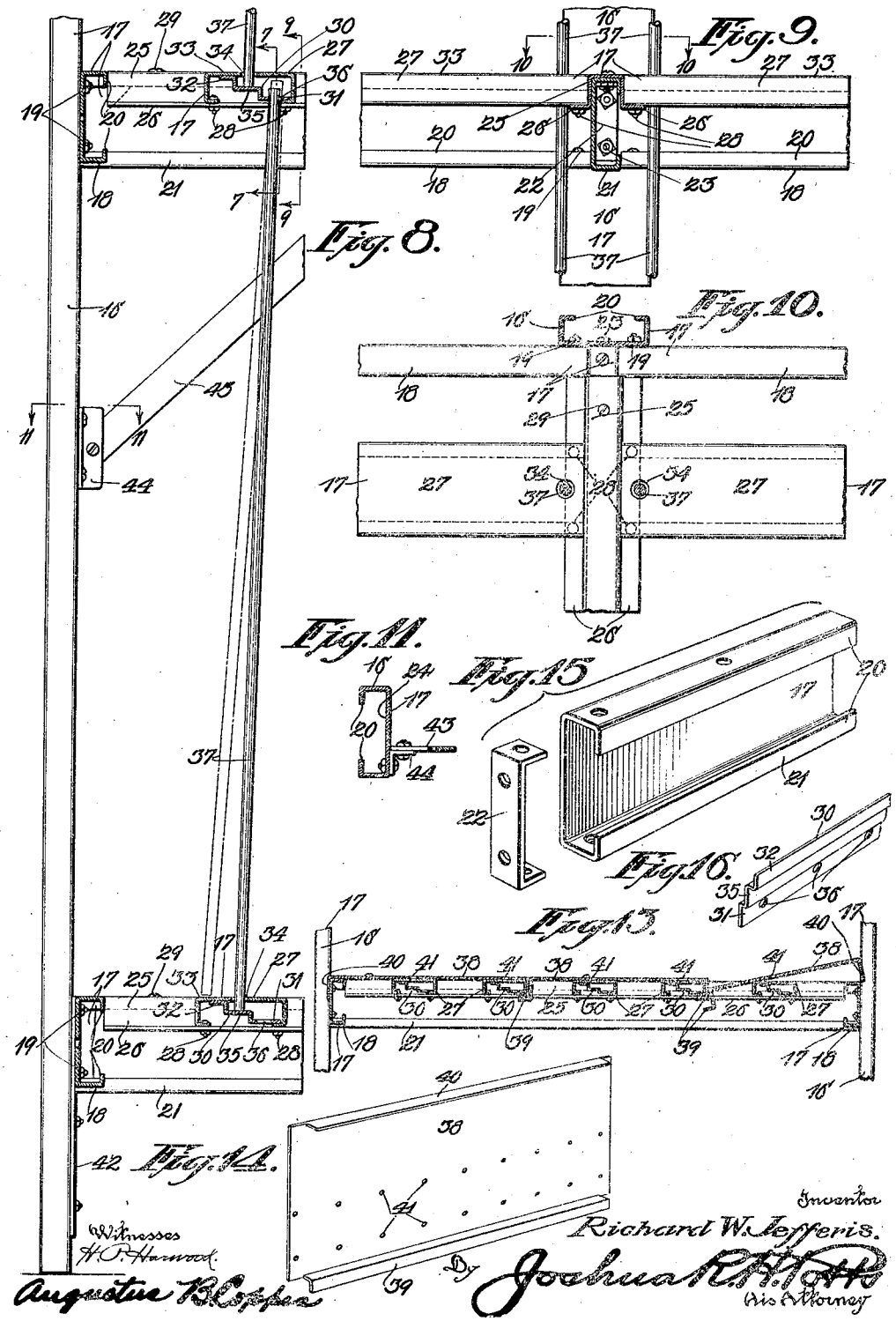

UNITED STATES PATENT OFFICE.

RICHARD W. JEFFERIS, OF PHILADELPHIA, PENNSYLVANIA.

RACK OR SHELVING.

1,341,852.  Specification of Letters Patent.  Patented June 1, 1920.

Application filed May 13, 1919. Serial No. 296,728.

*To all whom it may concern:*

Be it known that I, RICHARD W. JEFFERIS, a citizen of the United States, residing at Philadelphia, in the county of Philadelphia and State of Pennsylvania, have invented certain new and useful Improvements in Racks or Shelving, of which the following is a specification.

One object of my invention is to provide an improved rack on shelving which can be quickly made up or taken apart and which will consist of elements which are strong and durable.

Another object is to make the parts of my invention in such manner that they can be shipped and stored in a comparatively small space and can be readily adjusted so as to suit various requirements.

Another object of my invention is to provide an improved rack or shelving, which will permit of practically unlimited extension for supporting material in bulk of large dimensions.

These objects, and other advantageous ends which will be described hereinafter, I attain in the following manner, reference being had to the accompanying drawings in which—

Figure 1 is a side elevation of a rack or shelving constructed in accordance with my invention, Fig. 2 is a top plan view of Fig. 1, Fig. 3 is a sectional elevation taken on the line 3—3 of Fig. 1, Fig. 4 is a fragmentary sectional elevation taken on the line 4—4 of Fig. 3, Fig. 5 is a fragmentary elevation taken on the line 5—5 of Fig. 1 and drawn on an enlarged scale, Fig. 6 is a section taken on the line 6—6 of Fig. 5, Fig. 7 is a fragmentary section taken on the line 7—7 of Fig. 8 and drawn on the scale of Figs. 5 and 6, Fig. 8 is a fragmentary sectional elevation taken on the line 8—8 of Fig. 1 and drawn on an enlarged scale, Fig. 9 is a section taken on the line 9—9 of Fig. 8, Fig. 10 is a section taken on the line 10—10 of Fig. 9, Fig. 11 is a section taken on the line 11—11 of Fig. 8, Fig. 12 is a top plan view showing covering plates supported on the "slats" which are included in my invention, Fig. 13 is a fragmentary section taken on the line 13—13 of Fig. 12 showing one of the covering plates in a tilted position illustrating how the covering plates are inserted.

Fig. 14 is a perspective view of one of the covering plates,

Fig. 15 is a detached perspective view of certain of the elements of my invention, and Fig. 16 is a fragmentary perspective view of a portion of my invention.

Referring to the drawings, 16 are uprights or columns which are made of flanged metallic channels 17 of the shape clearly illustrated in Fig. 15. Side rails 18, which are also made in the form of the flanged channels 17, are secured to the columns 16 by stove bolts 19 in a manner so that the inwardly turned flanges 20 of the channels are located on the inside of the rack as shown in Figs. 5 and 8. Transverse rails 21, which are also made of the flanged channels 17, have filling pieces 22 secured in their ends and these filling pieces are secured by bolts 23 to the innermost portions 24 of the columns 16. Saddles 25 fit over the tops of the transverse rails 21 and have horizontally extending flanges 26 which form supports for slats 27, said slats also being made of the flanged channel structure 17 and are connected to the flanges 26 of the saddles 25 by bolts 28; the saddles being secured to the transverse rails by bolts 29, as clearly shown in Fig. 7. The slats 27 are arranged with their flanges 20 substantially in horizontal planes so that the bolts 28 extend through the flanges 20 of the slats 27 and the flanges 26 of the saddles 25. The top surfaces of the slats 27 are substantially flush with the top surfaces of the saddles 25 so that the slats and saddles form shelves which are smooth on their upper surfaces for the support of material in any character.

The slats 27 have strips 30 therein, said strips being stepped in cross section, the lower step 31 of said strip resting upon one of the flanges 20 of each of the slats while the uppermost step 32 is secured to the top 33 of the slat, as clearly shown in Fig. 8. The tops 33 of the slats 27 have holes 34 spaced apart, as clearly illustrated in Fig. 2 and these holes 34 are directly above the central steps 35 of the strips 30. The steps 31 of the strips 30 also have holes 36 which are spaced apart, as shown in Figs. 8 and 16. The holes 34 and 36 permit partition rods 37 to be positioned between the various shelves, said partition rods extending from a lower slat to an upper slat.

By constructing the slats and the stepped strips as above described, the upper ends of the rods 37 can be inserted upwardly through the holes 36, as shown in dot-and-dash lines in Fig. 8 and thus swung so that the lower ends of the rods will drop into the holes 34 and rest upon the steps 35; the steps 35 being closer to the tops 33 than the steps 31, there will be a portion of the top of the rod remaining within the uppermost slat so that the rods can be spaced in various positions, as illustrated in Fig. 1 to form compartments of different widths and they can be easily changed when it is necessary to vary the size of the compartments. Furthermore, the above mentioned construction permits the partition rods to be cut in continuous uniform lengths and no specially formed material is necessary to make the rods 37.

In some instances where it is desired to provide a continuous flooring for the shelves, I provide cover plates 38, said cover plates having hooked flanges 39 on one edge and straight flanges 40 on the opposite edge. These covering plates 38 may be provided with holes 41 for registering with the holes 34 in the slats 27 and may be applied, as clearly shown in Figs. 12 and 13 so as to rest upon the slats with the flanges 39 and 40 positioned as illustrated to embrace the side rails 18 and the slats 27.

The rails and columns have bracing plates 42 which are bolted thereto so as to reinforce the connecting parts, and brackets 43 are secured to angle plates 44 on the columns and to the flanges 20 of the transverse rails.

The slats 27 within their lengths, as illustrated, are supported by reinforcing rails 45, said rails being made of the flanged channel construction above described and having their ends secured to the side rails 18, as shown in Figs. 2 and 4. The reinforcing rails 45 are provided with filling pieces similar to the filling pieces 22. These filling pieces are bolted to the side rails 18.

By making the columns, rails and slats of flanged channels, the parts will be of comparatively little weight but extremely strong. At the same time, the several parts as described can be readily connected, room being provided for the various bolts so that the parts can be quickly connected together or taken apart. Further than this, the parts can be packed close together for transporting or storage purposes since all of the columns, rails and slats are of the same shape and can be arranged in a compact pile and will take up comparatively little room.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A rack of the character described including columns and side rails secured together; transverse rails consisting of channels having inwardly turned flanges; filling pieces inclosed in the end portions of said channel and having bent portions secured to said channels between their inwardly turned flanges; and means securing said filling pieces between their bent portions; substantially as described.

2. A rack of the character described including columns, side rails and transverse rails secured together, said transverse rails having flanged saddles thereon; and slats supported on the flanges of said saddles; substantially as described.

3. A rack of the character described including columns, side rails, and transverse rails secured together; superimposed slats supported by said transverse rails and having holes in their tops; stepped strips supported by said slats and having holes therein; and partition rods adapted to be inserted upwardly through the holes in said stepped strips and having their lower ends adapted to drop into the holes in the tops of the lower slats, the bottoms of said rods being adapted to rest on portions of said strips which are above the level of the holes in said strips; substantially as described.

4. A rack of the character described having slats supported in spaced relation; and covering plates for said slats, said covering plates having flanges on one edge adapted to embrace the slats, each of said plates having additional flanges on the other edge adapted to embrace one of said first flanges of another plate while in said first embracing position; substantially as described.

In testimony whereof I have signed my name to this specification in the presence of two subscribing witnesses.

RICHARD W. JEFFERIS.

Witnesses:
CHAS. E. POTTS,
AUGUSTUS B. COPPES.